(12) United States Patent
Guiter et al.

(10) Patent No.: US 7,804,489 B1
(45) Date of Patent: *Sep. 28, 2010

(54) METHOD AND APPARATUS FOR DISPLAYING INFORMATION IN A DISPLAY SCREEN REGION IDENTIFIED BY PERMANENT PRINTING

(75) Inventors: Olivier Guiter, Mireval (FR); Jerome Tredez, Montpellier (FR); Paul Plaquette, Montpellier (FR)

(73) Assignee: PalmSource Inc., Sunnyvale, CA (US)

( * ) Notice: Subject to any disclaimer, the term of this patent is extended or adjusted under 35 U.S.C. 154(b) by 213 days.

This patent is subject to a terminal disclaimer.

(21) Appl. No.: 10/640,753

(22) Filed: Aug. 13, 2003

Related U.S. Application Data

(63) Continuation of application No. 09/942,818, filed on Aug. 29, 2001.

(51) Int. Cl.
G09G 5/00 (2006.01)
(52) U.S. Cl. .................. 345/173; 178/18.01; 382/189
(58) Field of Classification Search ......... 345/173–179, 345/168, 169, 172, 1.1, 1.2, 2.1, 2.3; 178/18.01, 178/18.03; 382/175–179, 186–189; 455/556, 455/556.1, 566, 90
See application file for complete search history.

(56) References Cited

U.S. PATENT DOCUMENTS

| | | | | |
|---|---|---|---|---|
| 6,052,606 | A * | 4/2000 | Bowen ....................... | 345/173 |
| 6,295,372 | B1 * | 9/2001 | Hawkins et al. ............. | 382/187 |
| 6,418,325 | B1 * | 7/2002 | Reber et al. ............... | 455/556.1 |
| 6,498,601 | B1 * | 12/2002 | Gujar et al. ................ | 345/173 |
| 6,552,719 | B2 * | 4/2003 | Lui et al. .................... | 345/179 |
| 6,587,700 | B1 * | 7/2003 | Meins et al. .............. | 455/575.8 |
| 6,850,781 | B2 * | 2/2005 | Goto .......................... | 455/566 |
| 7,158,678 | B2 * | 1/2007 | Nagel et al. ................. | 345/173 |
| 2001/0034250 | A1 * | 10/2001 | Chadha ...................... | 455/566 |
| 2002/0058529 | A1 * | 5/2002 | Horie et al. ................ | 455/556 |
| 2002/0151283 | A1 * | 10/2002 | Pallakoff .................... | 455/90 |
| 2003/0023671 | A1 * | 1/2003 | Abdulrahiman et al. ..... | 709/203 |
| 2003/0038788 | A1 * | 2/2003 | Demartines et al. ......... | 345/173 |

* cited by examiner

Primary Examiner—Regina Liang
(74) Attorney, Agent, or Firm—Berry & Associates P.C.

(57) ABSTRACT

A method and system for displaying information on a hand held computer system in a display region identified by permanent printing. The hand held computer system may comprise a second display region, separate from the first display region located in the permanent printing region. Independent streams of information may be displayed on the separate display regions. Alternatively, the second display region may be a different region of a single display unit. The display region can display any type of information, e.g., alert information, clock information, phone messages, pager messages, etc. Display of information in the display region does not interfere with the second display region.

25 Claims, 11 Drawing Sheets

900

START

930 RECEIVE TOUCH INFORMATION

940 DISPLAY INK UNDER TOUCH LOCATION

950 RETURN TO CALLING ROUTINE

METHOD AND APPARATUS FOR DISPLAYING INFORMATION IN A DISPLAY SCREEN REGION IDENTIFIED BY PERMANENT PRINTING

RELATED APPLICATIONS

This application is a continuation application of co-pending U.S. patent application Ser. No. 09/942,818, filed in the U.S. Patent and Trademark Office on Aug. 29, 2001.

FIELD OF THE INVENTION

Embodiments of the present invention relate to portable computer systems. More particularly, embodiments of the present invention provide a portable viewing and computing apparatus and method to display information in a display region in an area marked by permanent printing that may be used to facilitate gesture recognition.

BACKGROUND ART

A conventional hand held computer system is shown in FIG. 1. System 100 contains display unit 110 and permanent printing 120, which is used to facilitate gesture recognition. There is no display capability in system 100 in the region identified by printing 120.

Display unit 110 and printing 120 are functionally coupled to a digitizing panel (not shown) which is responsive to touch across the combined area of display unit 110 and printing 120. The functional coupling of display unit 110 and printing 120 with the digitizing panel (not shown) produces a correspondence between displayed and printed graphics and touch actions. This allows system 100 to receive and interpret input from the user.

Printing 120 contains regions 120A and 120B. Gestures, or "moving touches" made in region 120A are interpreted as alphabetic characters, while gestures made in region 120B are interpreted as numeric characters. Gestures made elsewhere are not interpreted as characters.

There are many usability advantages realized by printing 120 over other prior art methods of facilitating gesture recognition. Some prior art systems lack printing 120, preferring instead to identify an area for gesture recognition on display unit 110, for example by displaying a graphical image similar to printing 120. However, printing 120 identifies an area dedicated for gesture recognition, which aids the user in maintaining context between gesturing and selecting items, such as a soft activation key, on display unit 110. Another advantage of printing 120 is the higher resolution achieved in printing 120 versus rendering a similar aide via the display unit.

Unfortunately, these advantages (and more) are realized at the cost of reducing the screen size of display unit 110 to accommodate printing 120.

SUMMARY OF THE INVENTION

Therefore, it would be advantageous to provide a method and system providing for the display of some information in the printed area used to facilitate gesture recognition while maintaining the many advantages of such a printed area. A further need exists for a hand held system that displays two independent information streams. A still further need exists for a system and method of displaying information using less power than a large, general purpose display.

Embodiments of the present invention provide a method and system for displaying information in the printed area used to facilitate gesture recognition. Embodiments provide a method and system that display two independent information streams. Further embodiments provide for a method and system that display information using less power than a large display. Embodiments of the present invention provide these advantages and others not specifically mentioned above but described in the sections to follow.

A method and system for displaying information in an area identified by permanent printing is disclosed. One embodiment of the present invention first displays information from a main program in a main display region. An interrupt signal from an event may be received. In response to the event, an independent information stream is displayed in a region identified by permanent printing. The permanent printing may be used to facilitate the recognition of stroke gestures. The user is able to interact with either program stream and its associated display information independent from the other program stream.

Another embodiment of the present invention is comprised of a single display unit, which has two separate display regions, one region being within the permanent printing region.

In another embodiment of the present invention, each display region is composed of a separate display unit, with one display unit being within the permanent printing region.

In yet another embodiment of the present invention, one display unit is configured to turn on in response to a signal that controls another display unit to turn off.

Another embodiment of the present invention provides for a method of displaying a keyboard image on a display region in the permanent printing region. An alphanumeric character for input into the hand held computer system is determined from the correspondence of the keyboard image and touch information.

In another embodiment of the present invention, information is displayed on a display region identified by permanent printing. The information allows a user to answer, conduct and end a telephone call without interrupting the use of a main display screen region.

In yet another embodiment, a short message, such as from the GSM Short Message Service (SMS), is received and displayed on a display screen region identified by permanent printing that may be used to facilitate gesture recognition.

BRIEF DESCRIPTION OF THE DRAWINGS

FIG. 9 is a flow diagram illustrating steps of a process for displaying digital ink in accordance with an embodiment of the present invention.

DETAILED DESCRIPTION OF THE INVENTION

Figure 1:
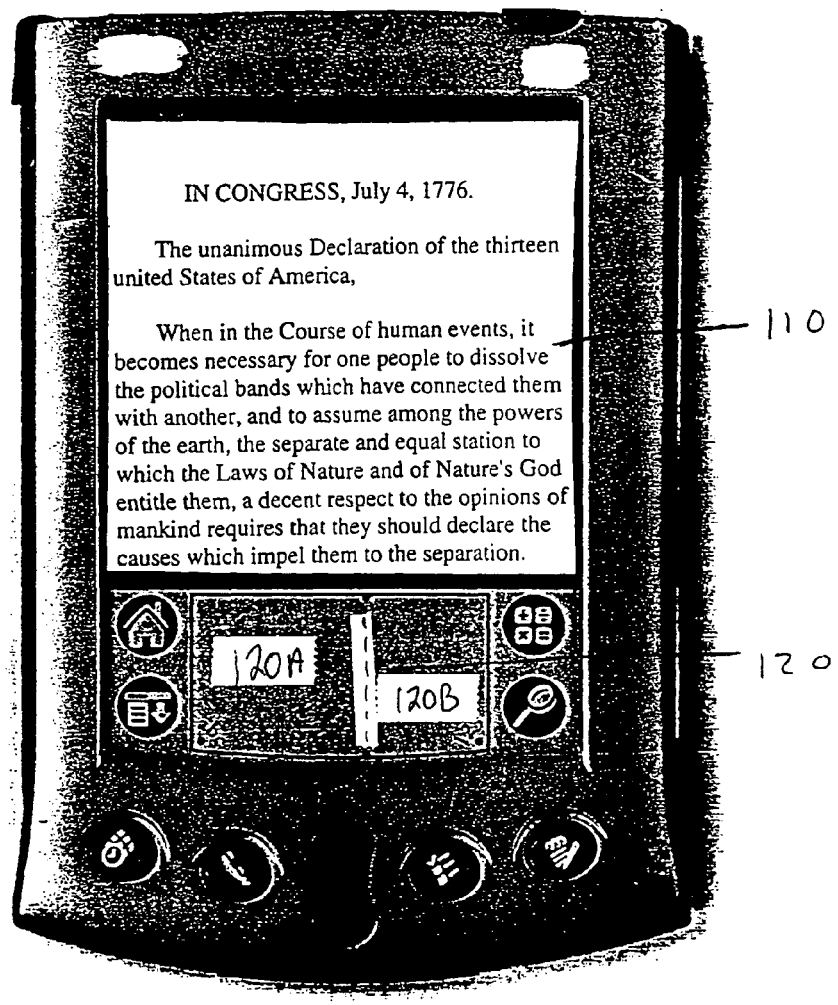
FIG. 1 is an illustration of a prior art hand held computer system.

In the following detailed description of the present invention, a method and system for displaying information in a screen region identified by permanent printing that may be used to facilitate gesture recognition, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions (e.g., processes 500, 700, 800, 900) which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "indexing" or "processing" or "computing" or "translating" or "calculating" or "determining" or "scrolling" or "displaying" or "recognizing" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Method and Apparatus for Displaying Information in a Display Screen Region Identified by Permanent Printing Embodiments of the present invention are described in the context of a hand held computer system. However, it is appreciated that the present invention may be utilized in other types of portable electronic devices that contain a permanent printing region on which a user may input data or control system function (e.g., beam data to another computer system) through gestures or handwriting recognition.

Figure 2A:
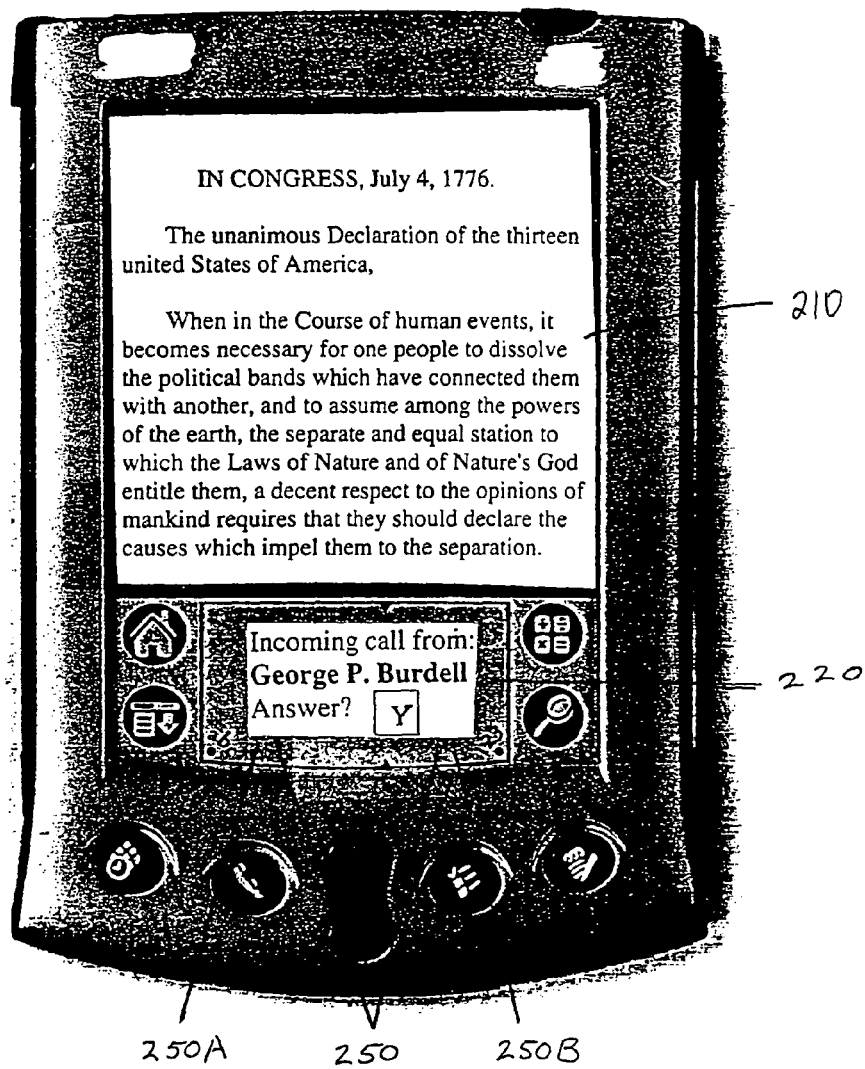
FIG. 2A illustrates a hand held computer system according to an embodiment of the present invention.

FIG. 2A illustrates an exemplary hand held computer system 200. System 200 comprises a main display region 210, and a second display region 220, located within a region of system 200 marked by permanent printing (also known as "silk screen region") 250. Printing 250 does not obscure display region 220.

Display region 220 may be used to display any type of textual and/or graphical information. As shown in FIG. 2A, display region 220 displays an alert message, which is independent of, and does not interfere with, the information displayed in display region 210. In general, an alert message is designed to alert the user to an event that is not part of the current operation.

Common alert messages include messages notifying the user of upcoming meetings and low battery states, or as shown in FIG. 2A, the receipt of an incoming telephone call. It is appreciated that other types of alert messages are well suited to embodiments of the present invention. In prior art system 100, an alert message would typically be displayed on display unit 110, interrupting the information previously displayed on display unit 110.

In one embodiment of the present invention, display region 220 is used to display clock information.

In another embodiment of the present invention, display region 220 is used to display a short message received over a wireless communication channel.

In yet another embodiment of the present invention, display region 220 is used to display a keyboard image.

It is appreciated that display region 220 is well suited to display very many other types of information, in accordance with embodiments of the present invention. Further examples include without limitation screen navigation toolbars, the running time of an audio/visual playback, a calculator display, flashing display region 220 as a whole or in part to attract a user's attention, displaying system status information and displaying advertising messages.

Further, it is appreciated that information displayed in display region 220 may have very many different relationships to information displayed (or not displayed) in display region 210, in accordance with embodiments of the present invention.

Display region 210, display region 220 and printing 250 are functionally coupled to a digitizing panel (not shown) which is responsive to touch across the combined area of display region 210 and printing 250. The functional coupling of display region 210, display region 220 and printing 250 with the digitizing panel (not shown) produces a visual correspondence between displayed graphics and touch actions. This allows system 200 to receive and interpret touch input from the user interacting with display region 220 or printing 250. The term functional coupling is not intended to imply an assembly order or technique, as the correspondence of visual elements and touch-sensing elements can be achieved in a variety of well-known ways.

In a preferred embodiment of the present invention, printing 250 is used to facilitate gesture recognition, and contains regions 250A and 250B. Gestures, or "moving touches" made in region 250A are interpreted as alphabetic characters, while gestures made in region 250B are interpreted as numeric characters.

It is appreciated, however, that in accordance with embodiments of the present invention, printing 250 may take other forms, including without limitation application program icons, system tool icons (e.g., a menu request icon), a wireless carrier logo, input shortcut icons (e.g., press here for ".com"), an icon to beam information to another computer system, an icon for switching languages of operation for the hand held device or images for controlling mobile telephone operation (e.g., "answer", "call", "end").

Figure 2B:
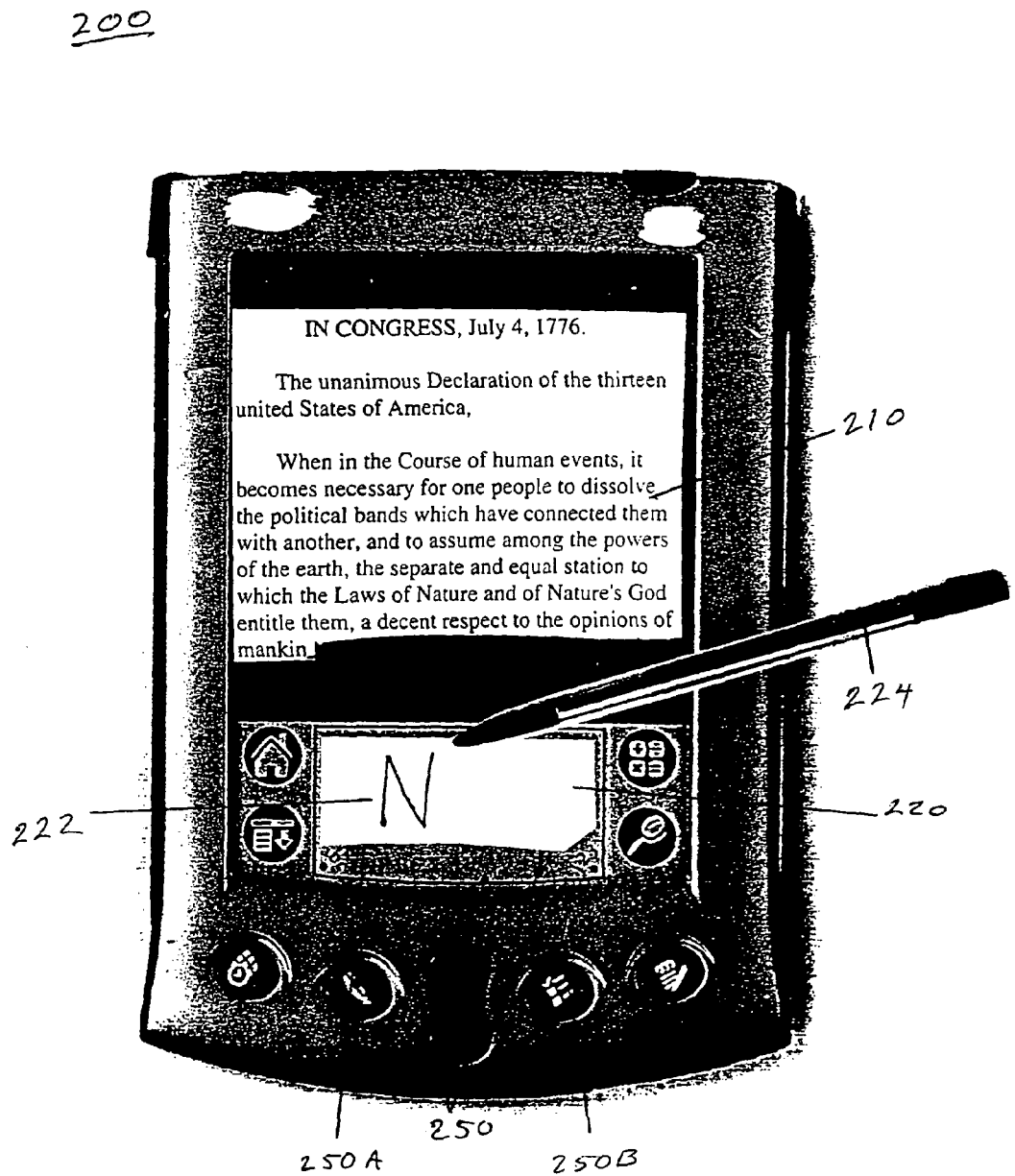
FIG. 2B illustrates a hand held computer system with a representation of digital ink according to an embodiment of the present invention.

FIG. 2B illustrates system 200 according to another embodiment of the present invention. Shown in FIG. 2B are image 222 and optional stylus 224, in addition to elements previously described. It is appreciated that optional stylus 224 is typically out of the plane of FIG. 2B.

Optional stylus 224 may be used to generate touch data to system 200 via the digitizer (not shown). It is appreciated that other forms of stylus 224 as well as user fingers are well suited to embodiments of the present invention.

Responsive to a stroke gesture recognized by the digitizer (not shown) made in the region of printing 250, system 200 may display image 222.

Image 222 is representation of ink in display region 220, displayed "under" optional stylus 224. In a preferred embodiment of the present invention, image 222 may be constructed in real time as the stroke gesture is made with optional stylus 224. That is, as each portion of the stroke gesture is made, a corresponding representation of that stroke is made until the final form of image 222 is achieved. It is appreciated that other well known techniques of establishing a time correspondence between image 222 and the stroke gesture are well suited to embodiments of the present invention.

As depicted in FIG. 2B, a user has made a stroke in region 250A of printing 250, which is interpreted by system 200 as the letter "n." In an exemplary implementation, the recognized letter "n" is displayed as the second "n" in the word "mankind" displayed in display region 210. It is appreciated that other well known uses of recognized gestures are well suited to embodiments of the present invention.

Figure 3A:
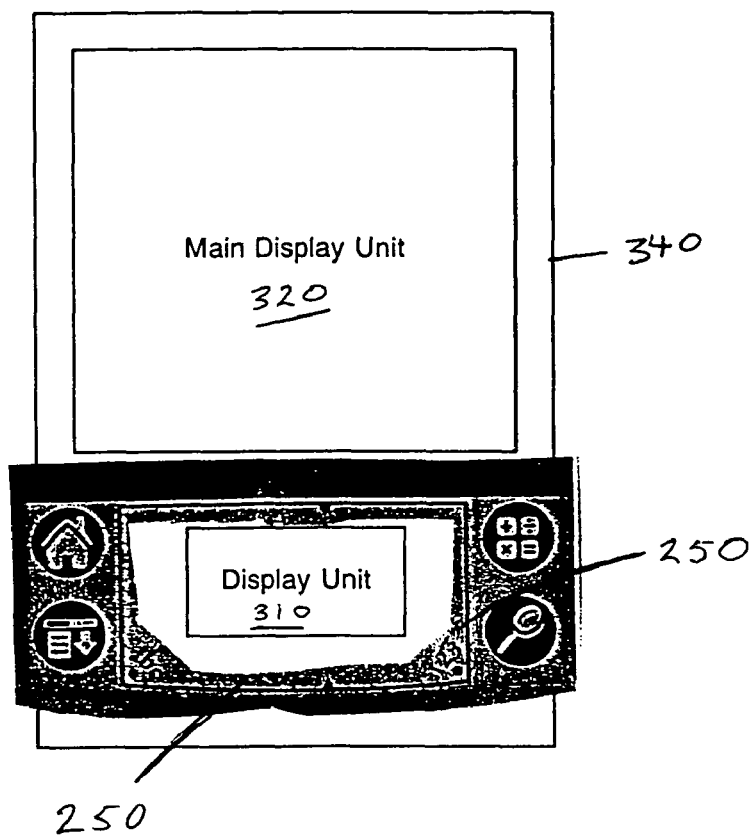
FIG. 3A illustrates a display unit assembly according to an embodiment of the present invention.

FIG. 3A illustrates a display module assembly 300 according to one embodiment of the present invention, as would typically be used in the construction of system 200. Assembly 300 comprises main display unit 320, permanent printing 250 to facilitate gesture recognition, display unit 310 located in a region identified by printing 250, and digitizer panel 340. Digitizer panel 340 is responsive to the touch of an indicating device (not shown) across the combined area of display region 210 and printing 250. In a preferred embodiment, digitizer panel 340 is a resistive panel. However, it is appreciated that other well-known digitizing panel types may be used with embodiments of the present invention.

In a preferred embodiment, digitizer panel 340 is non-opaque, and is assembled to the front of display unit 310, main display unit 320 and printing 250 so that all can be viewed through panel 340. It is appreciated that other possible arrangements of these components could be chosen. For example, printing 250 could be applied to the top of digitizer panel 340. Likewise, an opaque digitizer panel 340, for example an electro-magnetic digitizer panel, could be placed behind display unit 310, main display unit 320 and printing 250 so as not to obscure them.

Figure 3B:
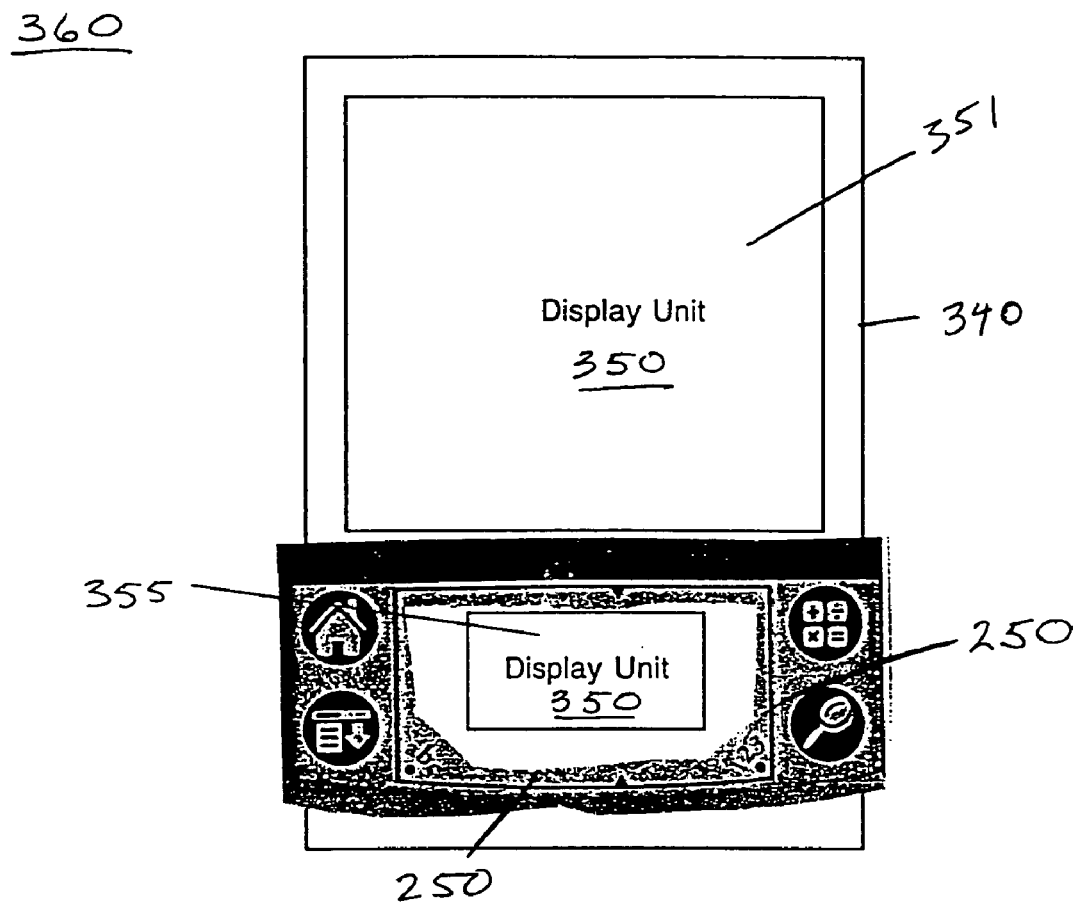
FIG. 3B illustrates a display unit assembly according to another embodiment of the present invention.

FIG. 3B illustrates a display module assembly 360 according to another embodiment of the present invention, as would typically be used in the construction of system 200. Assembly 360 comprises main display unit 350, permanent printing 250 which may be used to facilitate gesture recognition and digitizer panel 340.

Display unit 350 contains a display region 355 located within the area of printing 250 and display region 351, which is outside of the region of printing 250.

Thus, the single display unit 350 has two display regions—display region 351 which is the "normal" or main display region outside of printing 250, corresponding to display region 210, and display region 355 located within the area of printing 250, corresponding to display region 220.

Figure 4:
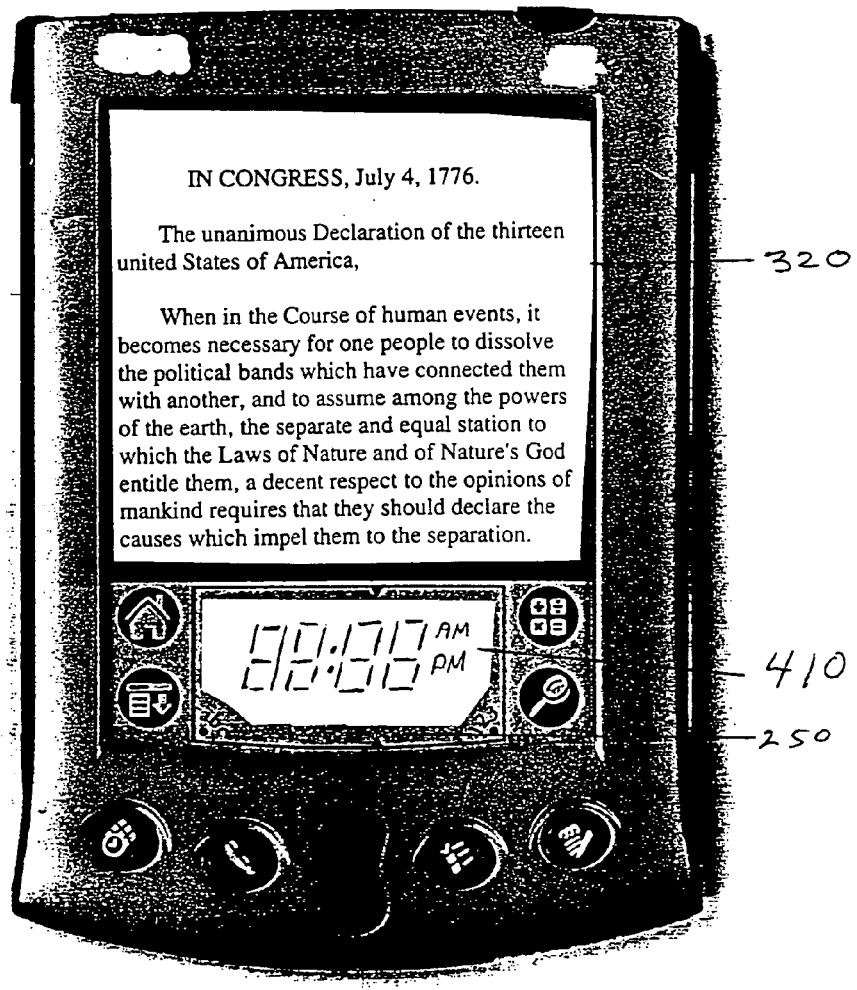
FIG. 4 illustrates a hand held computer system according to another embodiment of the present invention.

FIG. 4 illustrates system 400 according to another embodiment of the present invention. System 400 comprises main display unit 320, digitizer panel 340 (not shown in FIG. 4 because it is transparent), and display unit 410 located within the area of printing 250. Display unit 410 is optimized to provide maximum contrast and brightness at minimum power consumption for the display of clock information. Display unit 410 is similar to the display unit in many digital wristwatches. Because display unit 410 has relatively few display elements, it can provide clock information at a lower level of power consumption than a more general purpose display unit. It is appreciated that other specialized display units are well suited to the present invention. Examples of other specialized display units include without limitation telephone displays, calculator displays and sound-power level bar graph displays.

It is further appreciated that there is no requirement that display unit 320 and display unit 410 employ the same display technology. For example, while display unit 320 might be a liquid crystal display (LCD) consisting of many rows and columns of display elements, display unit 410 might be an organic light emitting diode (OLED) type of display. These choices allow the designer of system 400 to optimize the display characteristics for varying requirements of display information and varying requirements of system operating conditions. For example, more light may be needed from display unit 410 than from display unit 320 when display unit 410 is optimized for a telephone display.

In another embodiment of the present invention, display unit 410 can be configured to automatically turn on when main display unit 320 is turned off.

Figure 5:
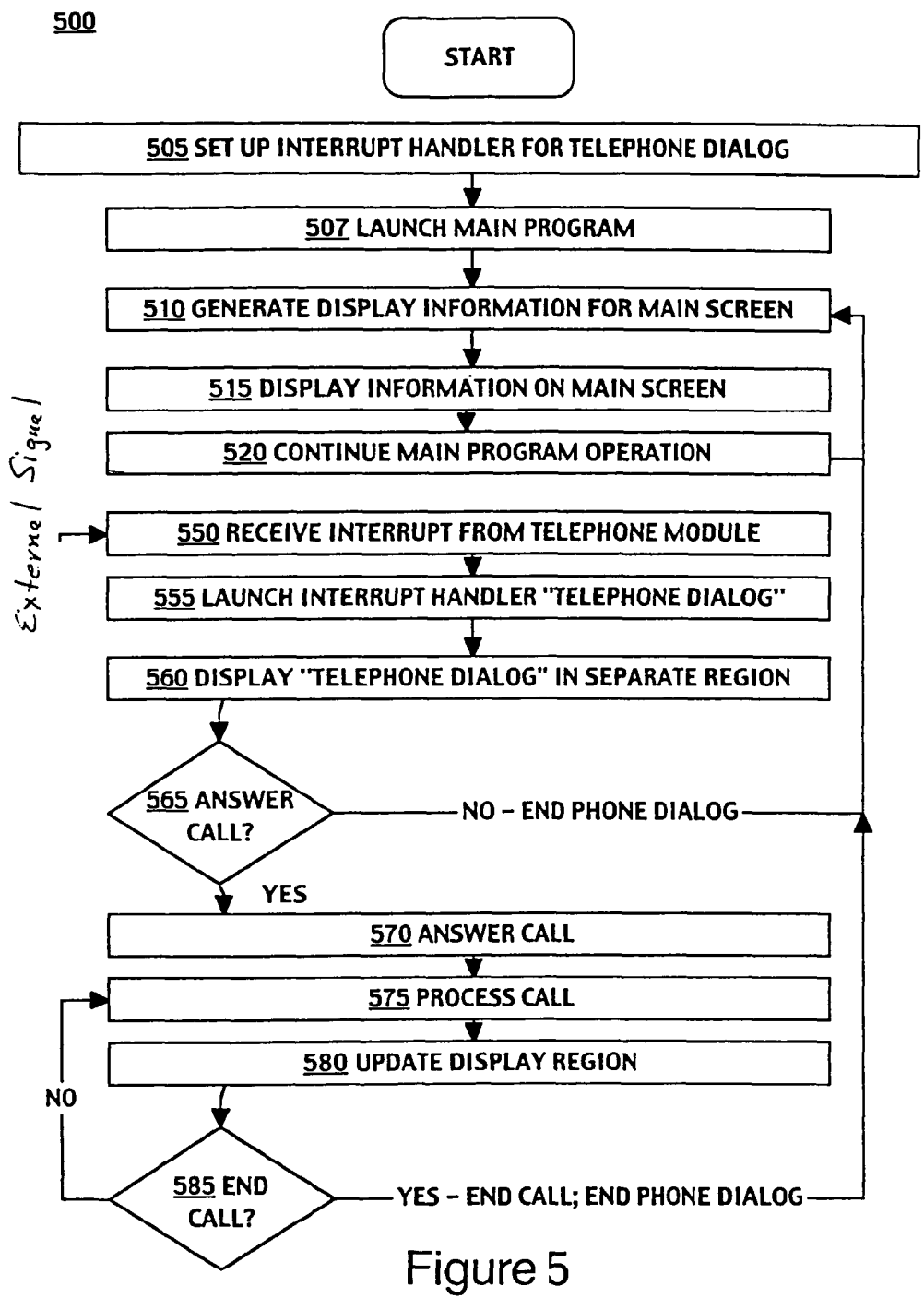
FIG. 5 is a flow diagram illustrating steps of a process for displaying information in a display region separate from a main display region and independent of the program flow represented in the main display region, according to an embodiment of the present invention.

FIG. 5 illustrates the steps of a process 500 for displaying information on a display region, for example display region 220, independent of the information displayed on a main display region, for example display unit 210, in response to an event.

In step 505, an interrupt is set up to provide the initial response to the event. The actual details of this step vary according to the specific details of the hardware and software, however the implementation of this step, given those specifics, is well known.

In step 507, the main program is initialized and in step 510 display information for the main display region is generated. In step 515, the process displays program information to the main display region. The information may take a vast variety of forms, including without limitation datebook schedule information, a phone list, an interactive game, or as illustrated in FIG. 2A on display region 210, an electronic book.

In step 520 the process continues, looping back to step 510 to generate and ultimately display new display information.

It is understood that a typical program to generate and display information to the main display region will be significantly more complex. However, steps 510 through 520 represent an exemplary process to illustrate the present invention.

It is also well understood that responding to an event, also known as "taking an interrupt," will interrupt the sequential flow of a main program, and execute an interrupt routine.

In step 550, just such an interrupt signal is received. The interrupt is generated from outside of the main program flow, for example from a radio-frequency telephone transceiver module. Another source could include a clock module. Still another example is a pager. The interrupt could even come from a different software module executing on the same system, for example, from a user input control routine which had been called previously by the main program.

In response to the interrupt signal, a new sub-process is initiated at step 555, in this example the sub process of controlling a telephone call is illustrated. The RF telephone module indicates to the system that an incoming phone call is available.

In step 560, the user is given the opportunity to answer the call. The user is interrogated via display information sent to display region 220 as shown in FIG. 2A. The display of the question in display region 220 does not affect the display of program information in display region 210. By employing the well-known technique of time slicing, user interaction with the program controlling main display region 210 is also not affected.

The user actually makes the choice in step 565. In the example as shown in FIG. 2A, touching the display over the letter "Y" makes the selection. It is appreciated that there are many other common techniques to capture a user response, including without limitation the use of hard buttons, thumb wheels and voice command.

If the user chooses not to answer the call, process flow returns to the main program at step 510. If the user chooses to answer the call, process flow continues to step 570.

Still referring to FIG. 5, in step 570, the RF telephone module is commanded to answer the call. In step 575 the RF telephone module provides call status information to the system.

In step 580, display region 220 is updated with call status information, for example the duration of the call. As with step 560, the display of new information to display region 220 does not affect display of program information in display region 210, nor does it affect user interaction with the main program.

Part of the display information displayed in step 580 is a user interrogatory to end the phone call. Should the user select to end the phone call, step 585 will direct the RF phone module to end the call, display information that the call has been ended, and transfer control back to the main program.

Figure 6:
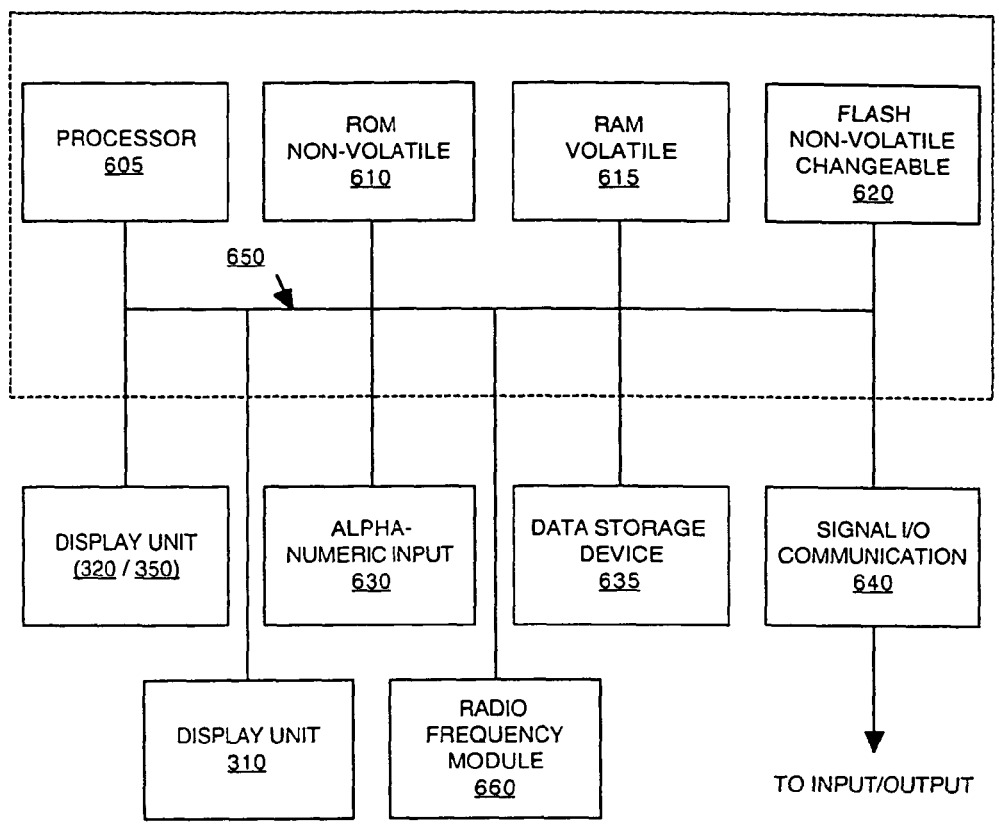
FIG. 6 is a block diagram of a computer system, which may be used as a platform to implement embodiments of the present invention.

FIG. 6 illustrates circuitry of computer system 600, which may form a platform for a portion of hand held computer system 200. Computer system 600 includes an address/data bus 650 for communicating information, a central processor 605 functionally coupled with the bus for processing information and instructions, a volatile memory 615 (e.g., random access memory RAM) coupled with the bus 650 for storing information and instructions for the central processor 605 and a non-volatile memory 610 (e.g., read only memory ROM) coupled with the bus 650 for storing static information and instructions for the processor 605. Computer system 600 also optionally includes a changeable, non-volatile memory 620 (e.g., flash) for storing information and instructions for the central processor 605 which can be updated after the manufacture of system 600.

Computer system 600 also optionally includes a data storage device 635 (e.g., a Secure Digital memory card) coupled with the bus 650 for storing information and instructions.

Also included in computer system 600 of FIG. 6 is an optional alphanumeric input device 630. Device 630 can communicate information and command selections to the central processor 600. Device 630 may take the form of a touch sensitive digitizer panel.

The display unit (either display unit 320 or display unit display unit 350) utilized with the computer system 600 may be a liquid crystal display (LCD) device, cathode ray tube (CRT), field emission device (FED, also called flat panel CRT), light emitting diode (LED), plasma display device, electro-luminescent display, electronic paper or other display device suitable for creating graphic images and alphanumeric characters recognizable to the user.

System 600 optionally includes a second display unit 310. Display unit 310 may be a liquid crystal display (LCD) device, cathode ray tube (CRT), field emission device (FED, also called flat panel CRT), light emitting diode (LED), plasma display device, electro-luminescent display, electronic paper or other display device suitable for creating graphic images and alphanumeric characters recognizable to the user. In particular, display unit 310 may use a different display technology than display unit 320.

System 600 optionally includes a radio frequency module 660, which may implement a mobile telephone, a pager, or a digital data link. Optional signal input/output communication device 640 is also coupled to bus 650.

Figure 7:
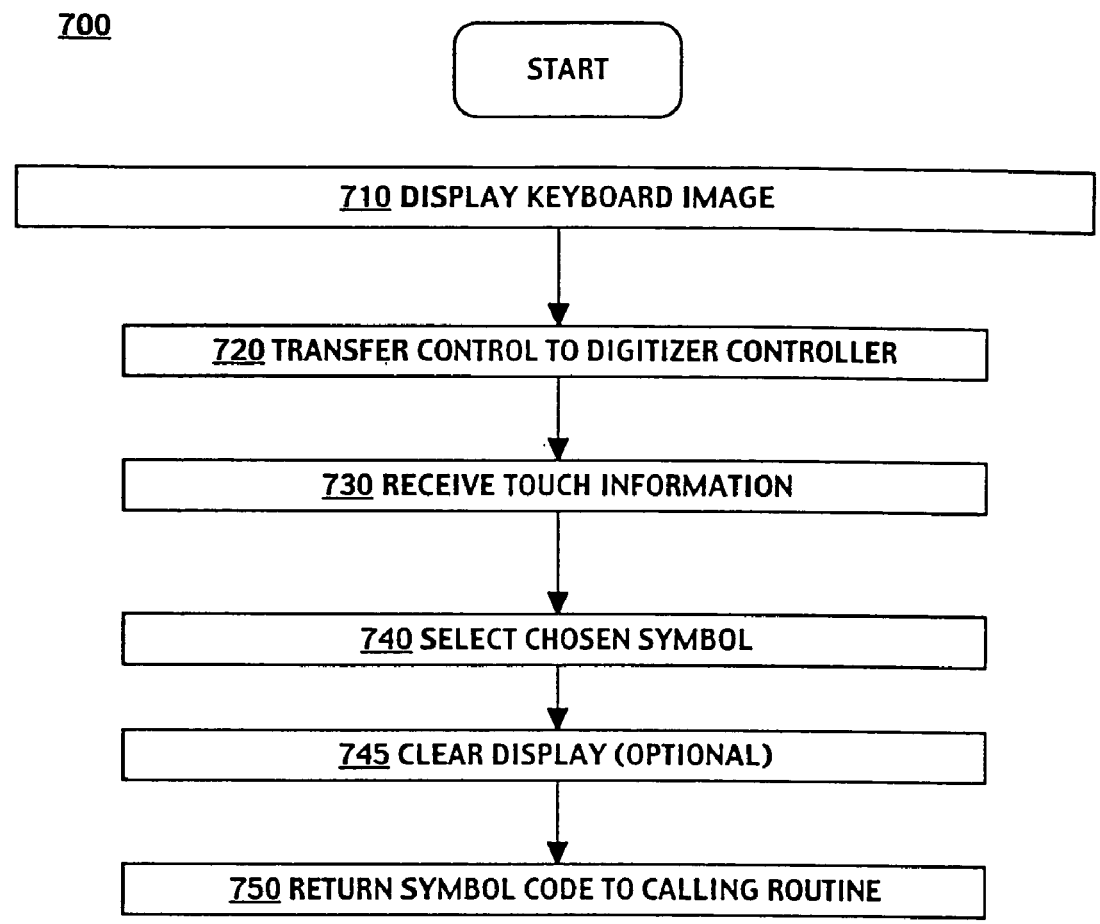
FIG. 7 is a flow diagram illustrating steps of a process for displaying a keyboard image and selecting an alphanumeric character based on the correspondence of the displayed image and touch information, in accordance with an embodiment of the present invention.

FIG. 7 illustrates the steps of a process 700 for displaying a keyboard image and sensing an alphanumeric user selection based on the correspondence of a user touch to the displayed keyboard image according to an embodiment of the present invention.

Process 700 is typically initiated as a subroutine in response to a main program request for alphanumeric input. Such requests are common in hand held computer systems, occurring, for example, when the user desires to put a name into an address book application.

In step 710, a keyboard image is displayed in display region 220. The display image may be general purpose or it may be specialized for the particular application running on the hand held computer system. One such specialized keyboard image may be for a scientific calculator, which displays numbers and keys for trigonometric functions. Another specialized keyboard image may be for a phone, including number keys for dialing, "send" and "end" keys for control of the phone call, and volume control keys.

In step 720, control is transferred to the digitizer control function, which is a standard function of such hand held computer systems.

In step 730, digitizer information is returned from the digitizer control routine. Such digitizer information generally takes the form of an X,Y coordinate pair. It is appreciated that many other methods of describing a touch event are possible.

In step 740, the digitizer information is associated with the keyboard image. For example, if the keyboard image was a QWERTY keyboard, the pair 1, 3 might indicate the letter "e." The chosen symbol is then encoded into the character code used by the hand held computer system.

In step 745, the keyboard display is optionally removed from the display screen region.

In step 750, the character code is returned to the calling routine, as well as program flow.

Figure 8:
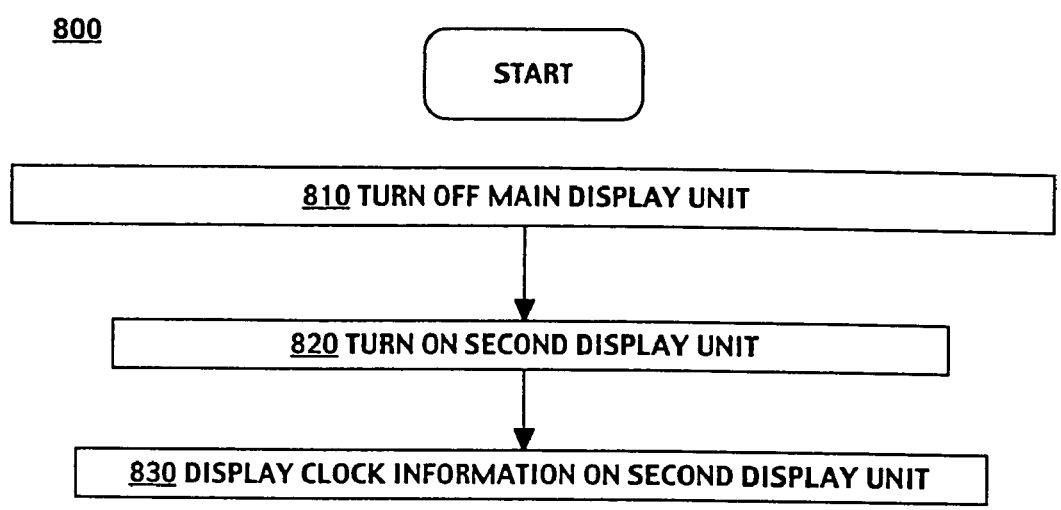
FIG. 8 is a flow diagram illustrating steps of a process for turning on a second display unit and displaying clock information in response to turning off a main display region, in accordance with one embodiment of the present invention.

FIG. 8 depicts the steps of a process 800 to turn off the main display unit, for example display unit 320, and automatically turn on a second display unit.

In step 810, the main display unit 320 is turned off. This is usually controlled by writing a control bit to a display control register. It is appreciated that there are many well known methods to accomplish control of the display, including both hardware and software based implementations, that are well suited to embodiments of the present invention.

Responsive to this signal, second display unit 410 is commanded on in step 820. Again, it is appreciated that there are many well known methods to accomplish control of this display as well.

Finally, in step 830, display information is sent to the second display unit 410, in this example the information facilitating a clock display.

In FIG. 9, process 900 of displaying ink under gestures in a region identified by permanent printing according to an embodiment of the present invention is described.

Process 900 is typically initiated as a subroutine in response to a main program request for alphanumeric input. Such requests are common in hand held computer systems, occurring, for example, when the user desires to put a name into an address book application. When the main program determines that gestures are being made in the region of printing 250, that touch information is sent to process 900.

In step 930, the touch information is received by process 900.

In step 940, the touch information is mapped to display region 220, such that a representation of ink appears under the location touched by the user.

In step 950, control is returned from process 900 to the calling routine.

The preferred embodiment of the present invention a system and method for displaying information on a display screen region identified by permanent printing is thus described. While the present invention has been described in particular embodiments, it should be appreciated that the present invention should not be construed as limited by such embodiments, but rather construed according to the below claims.

What is claimed is:

1. A method for displaying information on a portable electronic computer system having an independent display screen region and a separate display screen region defined for receiving stroke based input, comprising the steps of:
    generating electronically first and second information to be displayed as other than a keyboard image;
    storing the first generated information in a memory;
    outputting the first generated information as a bit stream to the separate display screen region of the portable electronic system in the area defined for receiving stroke based input; and
    outputting the second generated information for display in the independent display screen region independent of the first generated information and independent of stroke based input.

2. The method of claim 1 wherein said separate display screen region of said electronic system is within said area defined for receiving stroke based input and said independent display screen region is free of any area of permanent printing.

3. The method of claim 2 wherein said separate display screen region is implemented using a second screen display unit, and said independent display screen region is implemented using a first screen display unit.

4. The method of claim 3 further comprising turning off said first screen display unit and displaying said second generated information on said second first screen display unit.

5. The method of claim 3 further comprising displaying said first generated information on said second screen display unit automatically in response to a signal for turning off said first screen display unit.

6. The method of claim 1 wherein said first generated information is clock display information.

7. The method of claim 3 further comprising sending information for a clock display to said second display screen unit automatically in response to a signal for turning off said first display screen unit.

8. The method of claim 1 further comprising:
    sensing stroke gestures via a digitizing panel; and
    displaying a representation of ink on said separate display screen region, said representation corresponding to said stroke gestures.

9. The method of claim 2 wherein said separate display screen region and said independent display screen region are regions of a single display unit.

10. The method of claim 1 wherein said outputting the first generated information further comprises outputting an alert status message on said separate independent display screen region.

11. The method of claim 1 wherein said outputting the first generated information further comprises outputting a dialog of a telephone call on said separate display screen region.

12. The method of claim 1 further comprising:
    receiving a short message; and
    displaying said short message on said separate display screen region.

13. A portable electronic system having a stroke based input and comprising:
    a processor for generating first and second electronic information to be displayed as other than a keyboard image;
    a first display screen region coupled to said processor for displaying the generated first electronic information, said first display screen region being defined for receiving stroke based input, wherein the generated first electronic information is stored in memory and communicated as a bitstream for output by the first display screen region; and
    a second display screen region for displaying the second electronic information independent of the first information and independent of stroke based input.

14. The electronic system of claim 13, wherein the processor recognizes stroke gestures made in said first display region.

15. The electronic system of claim 13 further comprising a digitizing panel functionally coupled to said first display screen region and said second display screen region.

16. The electronic system of claim 13 wherein said first display region and said second display region are separate regions of a single display.

17. The electronic system of claim 13 wherein said first display screen region and said second display screen region are implemented as a first display screen unit and a distinct second display screen unit.

18. The electronic system of claim 17 wherein said first display screen unit is configured to remain operational when said second display unit is turned off.

19. The electronic system of claim 17 wherein said first display screen unit is configured to turn on automatically in response to a signal turning off said second display screen unit.

20. The electronic system of claim 17 wherein said first display screen unit is specialized for a clock display.

21. The electronic system of claim 13 further comprising a protective display cover, said protective display cover comprising at least one non-opaque region for viewing said first display region through said non-opaque region when said display cover is covering the display.

22. In a portable electronic system having a main display region, a second display screen region which defines an area for receiving stroke based input, a method for displaying information comprising:
- displaying program information on the main display screen region of said electronic system; and
- in response to a predetermined event, performing operations including:
- generating secondary electronic information to be displayed other than as a keyboard image;
- outputting said generated secondary electronic information on the second display screen region wherein said outputting said secondary electronic information is independent of the stroke based input and does not interfere with said displaying program information on said main display screen region and said secondary electronic information is stored in memory and communicated as a bitstream for output to the second display screen region.

23. The method of claim 22 wherein said predetermined event is an incoming phone call and wherein said generated secondary information is a dialog enabling a receipt of said phone call.

24. The method of claim 22 wherein said predetermined event is receipt of a short message and wherein said generated secondary information is a body of said short message.

25. The method of claim 22 wherein said predetermined event is a clock update and wherein said generated secondary information is clock display information.

* * * * *